June 6, 1967 W. M. SCHULZE 3,323,443
PORTABLE GRILL

Filed July 19, 1965 2 Sheets-Sheet 1

INVENTOR.
WILLIAM M. SCHULZE
BY
Braddock+Burd
ATTORNEYS

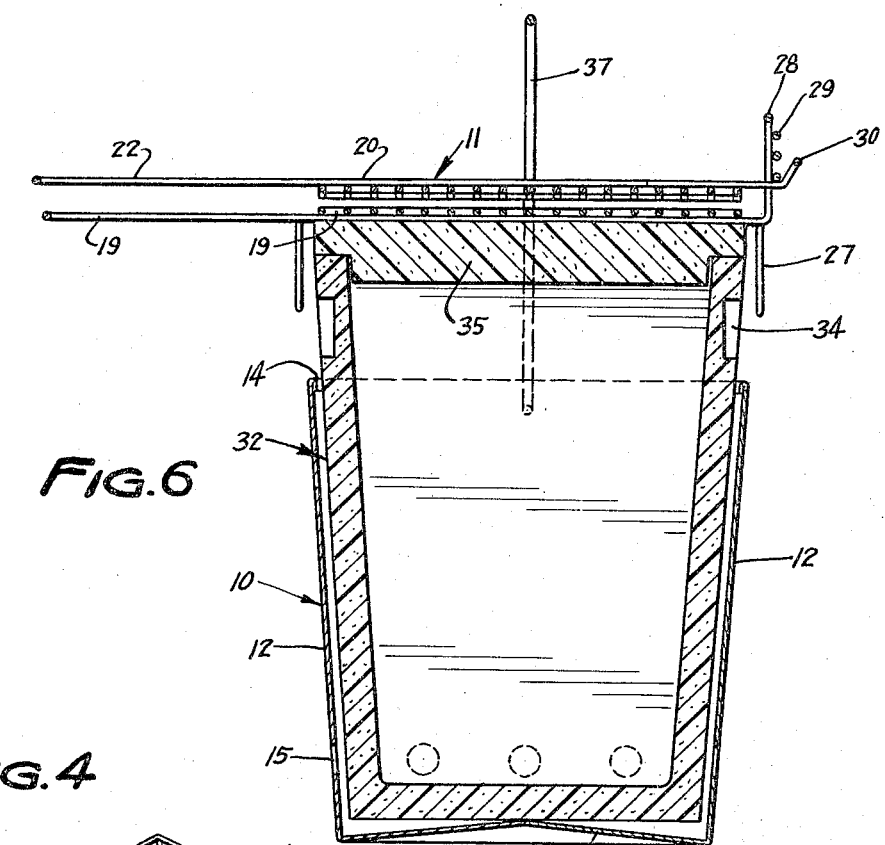
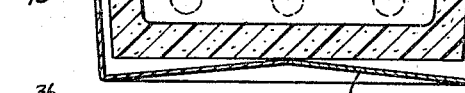
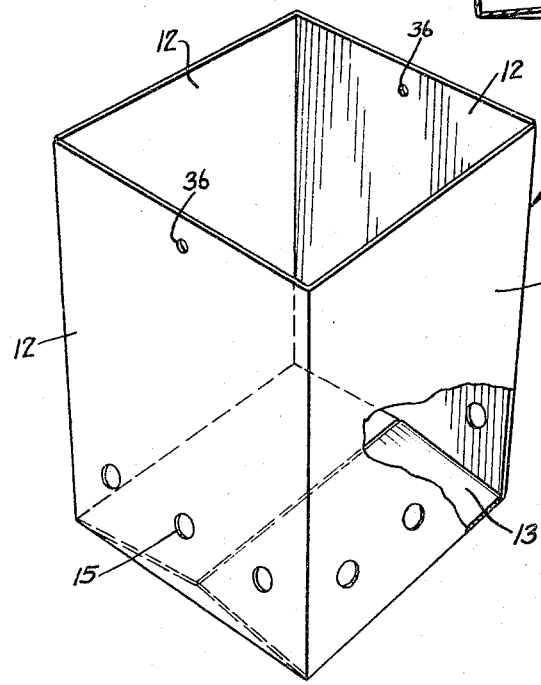

United States Patent Office 3,323,443
Patented June 6, 1967

3,323,443
PORTABLE GRILL
William M. Schulze, 224 W. Minnehaha Parkway,
Minneapolis, Minn. 55419
Filed July 19, 1965, Ser. No. 473,145
8 Claims. (Cl. 99—402)

This invention relates to a combination food carrier and portable grill for outdoor cooking, and more particularly to a portable grill designed to be fueled by paper sheet, such as newspaper.

The invention is illustrated in the accompanying drawings in which the same numerals refer to corresponding parts and in which.

FIGURE 4 is a perspective view of the stove or firebox section of the grill, shown partly broken away to reveal its interior construction;

FIGURE 5 is a plan view of a sheet metal blank from which the firebox portion of the grill is constructed; and FIGURE 6 is an elevation in section of the grill in combination with an insulated food carrying chest nested within the grill for carrying purposes.

Figures 1, 2:
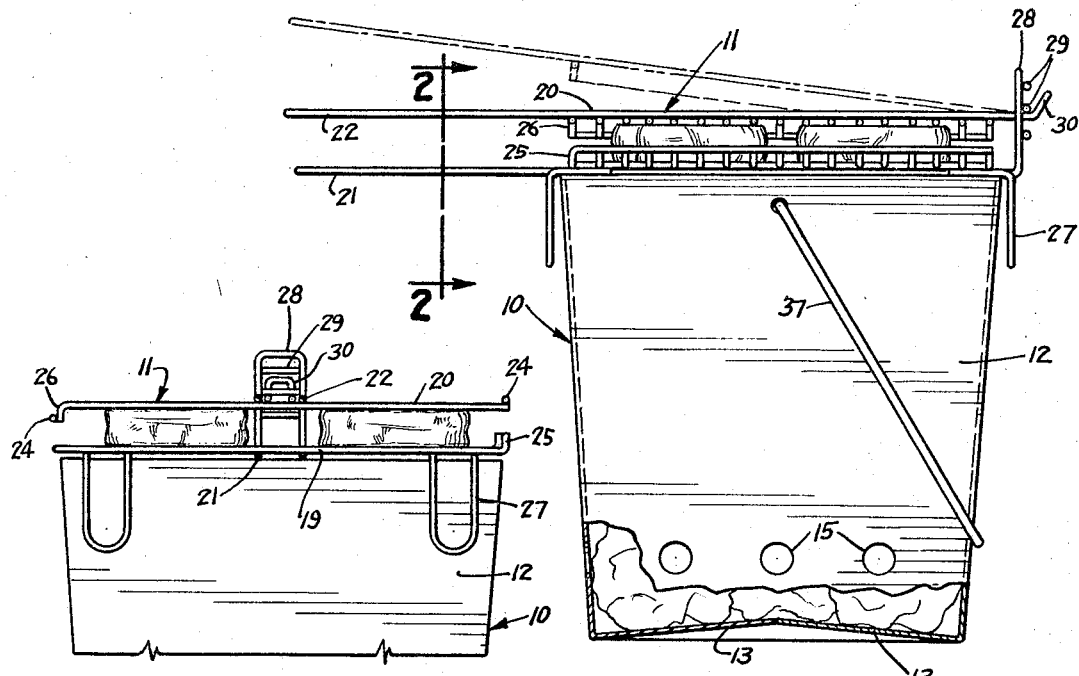
FIGURE 1 is a vertical elevation, partly broken away and in section, of the portable grill with broiler rack in place.
FIGURE 2 is a partial end elevation, partly in section on the line 2—2 of FIGURE 1 and in the direction of the arrows.
Figure 3:
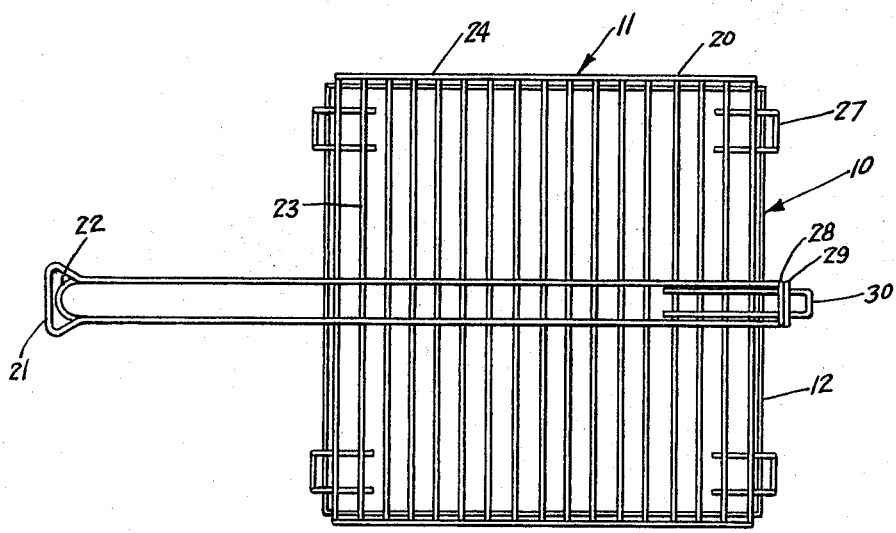
FIGURE 3 is a top plan view of the portable grill.

Referring now to the drawings, the portable grill according to the present invention is comprised of a rectangular stove or firebox portion, indicated generally at 10 and a broiler rack, indicated generally at 11. The stove or firebox portion 10 as shown is generally rectangular, and preferably square, having side walls 12 generally in the form of rectangles, or preferably isosceles trapezoids, as shown. The latter provide increased cooking area without materially increasing the overall dimension of the portable grill and provide better air circulation for efficient operation of the grill. The bottom wall portions 13 are rectangular and each covers one-half of the bottom of the firebox. The bottom walls are preferably joined together so that the bottom of the firebox is slightly concave from the outside so as to permit the grill to be set firmly on the ground, even where the terrain is somewhat rough. The top edge 14 of each side wall 12 is desirably folded or rolled for increased strength and safety against sharp edges.

A plurality of air vents 15 are provided in each side wall 12 spaced upwardly from the bottom edge. The number and size and precise location of air vents 15 is not critical. Typically three one inch diameter air vents spaced about two and one-half inches from the bottom edge may be provided in each side wall 12. However, a larger number of air vents of lesser diameter may be provided. These may be spaced anywhere from immediately adjacent the bottom up to four or five inches or more from the bottom edge.

The stove or firebox portion 10 of the portable grill is preferably formed from two identical sheet metal blanks, as shown in FIGURE 5. Each blank is composed of two side wall segments 12 separated by a fold line 16 and a bottom wall segment 13 separated from one of the side wall segments by a fold line 17. Two such blanks are assembled into a stove or firebox portion 10 by first bending the blanks at approximately right angles along the fold lines 16 and 17, the folds being in the same direction in both instances. The two bent blanks can then be assembled into the form shown in FIGURE 4 with a minimum of six spot welds, two between each of the adjacent abutting side wall edges and two between the adjacent abutting bottom wall edges. A tight fit of the seams is not necessary. A loose fit between adjacent abutting edges provides further ventilation which contributes to the efficient operation of the grill.

The overall height of the stove or firebox portion 10 of the portable grill may vary between about 12 and 18 inches. A typical exemplary portable grill is about 13 inches square at the top, about 12 inches square at the bottom and about 14 inches high, but, obviously these dimensions can be varied considerably.

The broiler rack 11 is composed of two separable parts, a lower rack portion or grate 19 and an upper rack portion or grate 20. Both are formed from heavy gauge wire formed into flat openwork grates or trays of generally the same size and configuration as the top opening of the stove or firebox portion 10 of the portable grill. Lower grate 19 has a handle 21 and upper grate 20 has a similar handle 22 each extending outwardly from the center of one side of the grates in the same direction so that both can be grasped by the hand of the individual who is cooking on the grill.

As illustrated, each grate is comprised of a plurality of spaced apart parallel wires 23 extending transversely relative to the direction of the handles and connected to longitudinal end wires or bars 24. Optionally, the ends of wires 23 of the lower grate 19 may be turned up at 25 on one side and the corresponding wires of grate 20 are turned down at 26 on the other side. This permits the entire rack assembly to be turned over without danger of the food being cooked sliding out from between the rack members.

The lower rack member 19 is provided with a plurality of legs 27 welded or otherwise fastened adjacent the edges of the grate. Legs 27 perform a dual function. The legs 27 are positioned so as to engage the top edge of the firebox portion 10 of the grill in order to position and maintain the rack assembly on the top of the firebox. The legs 27 also permit the grate to be set down when removed from the fire on a tabletop or on the ground when picnicking or camping without harm to the tabletop and without contaminating the food held on the grate. In a typical grill the legs 27 may vary in length between about one and five inches.

The lower grate member 19 is also provided with an upwardly projecting wire loop 28 positioned approximately in the center of the side of the lower grate member 19 opposite from handle 21. Desirably loop 28 and handle 21 may be formed integrally. The upstanding loop 28 is spanned by a plurality of parallel spaced apart horizontal bars or rods 29 secured to the opposite legs of the loop to form a ladder-like structure. The center of the side of upper grate member 20 opposite from handle 22 is provided with an angularly upwardly projecting tip or lip 30 adapted to be received in and engaged by one of the openings formed by loop 28 and bars 29. The lip or tip 30 is desirably also formed as a wire loop of lesser width than loop 28 so as to be received within the latter.

The combination of loop 28 and bars 29 with the lip 30 forms an adjustable hinge for the broiler rack. The rack can be adjusted to receive food to be cooked, whether relatively thick or relatively thin, depending upon which of the bars 29 is engaged by the lip 30. The upper and lower rack members remain substantially parallel in any of the adjusted positions. The individual cooking on the grill can grasp the handles 20 and 21 and turn the entire broiler rack assembly with contained food without fear of the rack becoming disassembled and spilling the food on the ground.

As seen in FIGURE 6, the portable grill is designed for combination with an insulated chest, indicated generally at 32, for carrying purposes. Chest 32 is desirably formed from expanded plastic, such as plastic foam, such as polystyrene foam or the like. It may be molded or fabricated from sheets to form a box of a size and shape adapted to fit telescopically within the firebox portion of the grill. The insulated chest 32 is of a height greater than that of the firebox 10 so that the chest extends beyond the top of the firebox portion to permit easy separation of the two. To facilitate such separation, hand grips 34 or similar handle means may be provided. The chest 32 is provided with a tightly fitting lid or cover 35 and the broiler rack 11 is adapted to be carried on top of the cover with legs 27 engaging the top of the chest.

Two opposite sides of the firebox 10 are provided with bail sockets 36 into which are fit the ends of a wire bail 37, or similar handle means. The bail 37 swings out of the way when the grill is in use and swings up over the top of the insulated chest 32 and broiler rack 11 to hold them together when the entire portable grill assembly is carried.

In use, the assembled combination unit may be easily carried on picnics, camping trips and the like. The food to be cooked and other commodities can be carried within the insulated chest. Upon reaching the picnic or camping site, the chest is easily separated from the firebox portion of the grill. The grill is fueled by three or four newspaper sheets crumpled into fairly tight balls and dropped into the grill. The newspaper may be lighted by a match either from the top or through one of the air vents. The meat or other food to be cooked secured in the broiler rack can be placed on top of the fire at once.

Initial flareup of the burning paper starts the fats and oils dripping from the food and cooking begins. The fat drips in the fire and assists in keeping it going. The charred paper acts like a wick to distribute the fat drippings as they burn. The plentiful air supply facilitates complete combustion and minimizes any tendency to smoke. If additional fuel becomes necessary, a few extra crumpled sheets of newspaper may be added. Depending upon individual taste, steak, lobster, frankfurters, chops, ground meat patties, etc., can be cooked in from five to ten minutes. The broiler rack assembly is turned over for part of the cooking time to cook the food uniformly on both sides.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A portable food cooking grill comprising a relatively deep firebox adapted to be fueled with crumpled paper sheets and having a bottom, side walls and open top; said side walls being flared whereby said open top has greater overall area than said bottom; a plurality of air vents in said side walls adjacent said bottom and spaced around said firebox; a broiler rack fitted over the open top of said firebox; said rack including a pair of openwork grates each having generally the same size and shape as the open end of said firebox and each having an extending handle; adjustable hinge means connecting said grates along one side opposite from said handles; the lowermost of said grates being provided with a plurality of depending legs; said legs being spaced about the periphery of said grate and in engagement with the outer edges of the open top of said firebox to retain the rack thereon.

2. A portable grill according to claim 1 further characterized in that said adjustable hinge means includes an upwardly extending ladder-like projection on one side of one of said grates opposite from the handle, said upwardly extending projection having a plurality of vertically spaced lip-engaging apertures therein, and an angularly upwardly projecting lip extending from one side of the other of said grates opposite from said handle, said lip being adapted to engage one of the apertures of said ladder-like projection to vary the spacing between said grates.

3. A portable grill according to claim 1 further characterized in that said open top of said firebox is generally rectangular and said firebox is composed of two identical folded sheet metal blanks secured together, each of said blanks being composed of two flat side walls joined together along a fold line and one half of the bottom joined to one of said side walls along a fold line.

4. A portable grill according to claim 1 further characterized in that said firebox is from about 12 to 18 inches high and said depending legs are from about 1 to 5 inches long.

5. A combination portable food cooking grill and food carrier comprising a relatively deep firebox adapted to be fueled with crumpled paper sheets and having a bottom, side walls and open top; said bottom having lesser overall area than said open top; a plurality of air vents in said side walls adjacent said bottom; an insulated food chest fitted telescopically within said firebox and extending upwardly above the open top thereof; a tight fitting cover on said chest; said cover having generally the same size and shape as the open end of said firebox; a broiler rack fitted over the cover of said insulated chest; said rack including a pair of openwork grates each having generally the same size and shape as the open end of said firebox and having an extending handle; adjustable hinge means connecting said grates; the lowermost of said grates being provided with a plurality of depending legs; said legs being in engagement with the cover and top portion of said insulated chest; and carrying means holding said firebox, insulated chest and broiler rack in engagement for carrying.

6. A combination grill and carrier according to claim 5 further characterized in that said adjustable hinge means includes an upwardly extending ladder-like projection on one side of one of said grates opposite from the handle, said upwardly extending projection having a plurality of vertically spaced lip-engaging apertures therein, and an angularly upwardly projecting lip extending from one side of the other of said grates opposite from said handle, said lip being adapted to engage one of the apertures of said ladder-like projection to vary the spacing between said grates.

7. A combination grill and carrier according to claim 5 further characterized in that said open top of said firebox is generally rectangular and said firebox is composed of two identical folded sheet metal blanks secured together, each of said blanks being composed of two flat side walls joined together along a fold line and one half of the bottom joined to one of said side walls along a fold line.

8. A combination grill and carrier according to claim 5 further characterized in that said firebox is from about 12 to 18 inches high and said depending legs are from about 1 to 5 inches long.

References Cited

UNITED STATES PATENTS

| | | | |
|---|---|---|---|
| 2,009,189 | 7/1935 | Ash | 126—25 |
| 2,334,847 | 11/1943 | Spiers | 126—25 |
| 2,868,111 | 1/1959 | Laskowski | 99—402 |
| 3,046,969 | 7/1962 | Davis | 126—25 X |
| 3,146,773 | 9/1964 | Melzer | 126—9 |
| 3,255,607 | 6/1966 | Bair et al. | 62—530 X |

FOREIGN PATENTS

| | | |
|---|---|---|
| 770,794 | 7/1934 | France. |
| 804,933 | 8/1936 | France. |

FREDERICK KETTERER, *Primary Examiner.*